(12) United States Patent
Barringer et al.

(10) Patent No.: US 7,909,180 B2
(45) Date of Patent: Mar. 22, 2011

(54) LOAD BALANCING ROBUST COMPUTER FRAME

(75) Inventors: Dennis R. Barringer, Wallkill, NY (US); Shawn Canfield, Poughkeepsie, NY (US); Edward F. Furey, Kingston, NY (US); Robert R. Genest, Poughkeepsie, NY (US); John J. Loparco, Poughkeepsie, NY (US); Budy D. Notohardjono, Poughkeepsie, NY (US); John G. Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 11/947,332

(22) Filed: Nov. 29, 2007

(65) Prior Publication Data
US 2009/0140617 A1 Jun. 4, 2009

(51) Int. Cl.
A47F 7/00 (2006.01)
(52) U.S. Cl. .................. 211/26; 211/134; 312/223.1
(58) Field of Classification Search ........... 312/223.1, 312/351; 108/60, 61; 211/26, 189, 184, 211/134, 190, 207, 186, 187; 70/58, 85; 36/724–727
See application file for complete search history.

(56) References Cited

U.S. PATENT DOCUMENTS

| 401,368 | A | * | 4/1889 | Piper | 254/104 |
|---|---|---|---|---|---|
| 1,794,798 | A | * | 3/1931 | Sarr | 254/104 |
| 3,239,218 | A | * | 3/1966 | Reeves | 271/148 |
| 3,390,862 | A | * | 7/1968 | Schrepfer | 254/104 |
| 3,965,721 | A | * | 6/1976 | Roch | 72/462 |
| 4,845,591 | A | * | 7/1989 | Pavie | 361/726 |
| 5,201,415 | A | * | 4/1993 | Metz | 206/707 |
| 5,427,349 | A | * | 6/1995 | Obrecht | 248/657 |
| 5,503,581 | A | * | 4/1996 | McCullough | 441/79 |
| 5,566,414 | A | * | 10/1996 | Nonaka | 14/73.5 |
| 5,722,639 | A | * | 3/1998 | Nonaka | 254/104 |
| 5,868,261 | A | * | 2/1999 | Collins et al. | 211/26 |
| 6,209,842 | B1 | * | 4/2001 | Anderson et al. | 248/560 |
| 6,341,511 | B1 | * | 1/2002 | Snoke et al. | 70/85 |
| 6,450,597 | B1 | * | 9/2002 | Bell et al. | 312/223.1 |
| 6,480,391 | B1 | * | 11/2002 | Monson et al. | 361/752 |
| 6,628,513 | B1 | * | 9/2003 | Gallagher et al. | 361/679.33 |
| 6,629,614 | B2 | * | 10/2003 | Jordan | 211/26 |
| 6,702,246 | B1 | * | 3/2004 | Schriever | 248/656 |
| 6,909,611 | B2 | * | 6/2005 | Smith et al. | 361/727 |
| 6,940,730 | B1 | * | 9/2005 | Berg et al. | 361/796 |
| 7,023,693 | B2 | * | 4/2006 | Yuan et al. | 361/679.39 |
| 7,128,219 | B2 | * | 10/2006 | Marraffa | 211/49.1 |
| 7,193,857 | B2 | * | 3/2007 | Robbins et al. | 361/727 |
| 7,227,751 | B2 | * | 6/2007 | Robbins et al. | 361/695 |
| 7,567,437 | B2 | * | 7/2009 | Liang | 361/695 |
| 2002/0153811 | A1 | * | 10/2002 | Kluser et al. | 312/223.1 |
| 2002/0176231 | A1 | * | 11/2002 | Bodensteiner et al. | 361/724 |
| 2003/0047524 | A1 | * | 3/2003 | Sato et al. | 211/1 |
| 2004/0057216 | A1 | * | 3/2004 | Smith et al. | 361/724 |
| 2007/0095774 | A1 | * | 5/2007 | Canfield et al. | 211/189 |
| 2008/0135503 | A1 | * | 6/2008 | Hidaka | 211/26 |

* cited by examiner

*Primary Examiner* — Janet M Wilkens
*Assistant Examiner* — Dan Rohrhoff
(74) *Attorney, Agent, or Firm* — Dennis Jung; Geraldine Monteleone (57) ABSTRACT

A load balancing method and incorporated assembly is provided for a computer frame having side walls. The assembly comprises a mid-plane plate having top and bottom sides and capable of being secured to the frames inside side walls. The mid-plane plate also has means both on its top and bottom sides for securing a number of electronic books in such a manner that they can be stacked on top of or adjacent to one another. A locking mechanism can also be provided as part of the assembly or alone to further secure the electronic books to the frame.

19 Claims, 6 Drawing Sheets

LOAD BALANCING ROBUST COMPUTER FRAME

CROSS-REFERENCE TO RELATED APPLICATIONS

This application contains subject matter which is related to the subject matter of the co-pending application Ser. No. 11/262,051 which was filed on Oct. 28, 2005. That application which is hereby incorporated by reference in its entirety is also assigned to International Business Machines Corporation of Armonk, N.Y.

BACKGROUND OF THE INVENTION

1. Field of the Invention

This invention relates to packaging of computing systems and more particularly to packaging of large computing systems that utilize frames and cages.

2. Description of Background

The industry trend has been to continuously increase the number of electronic components inside computing systems. A computing system can include a simple personal computer, a network of simple computers, or even a network of large computers that include one or more central electronic systems (CEC). While increasing the components inside a simple computing system does create some challenges, however, such an increase create many problems in computing systems that include one or more large computers. In such instances many seemingly isolated issues affect one another, especially when packaged together in a single assembly or networked or housed to other systems that are stored in close proximity.

One such particular challenge deals with dynamic loading effects. In many instances CECs and other similar large computers are housed in an assembly which is then on a rack or frame. The number of electronic components (such as daughter cards, elements and components that support logic entities, mid-plane boards and the like), in a dense packaging environment makes the assembly quite heavy. Therefore, structural integrity and dynamic loading effects are crucial issues that need to be addressed in such environments. Increasing the robustness of the frame or rack can be a solution, but one that has to be considered carefully as any added weight affect transportation and storage of such a unit. Moreover, system stability is a concern, especially during maintenance procedures. A system that is stacked high vertically, can topple over quickly due to its center of gravity.

Figure 1:
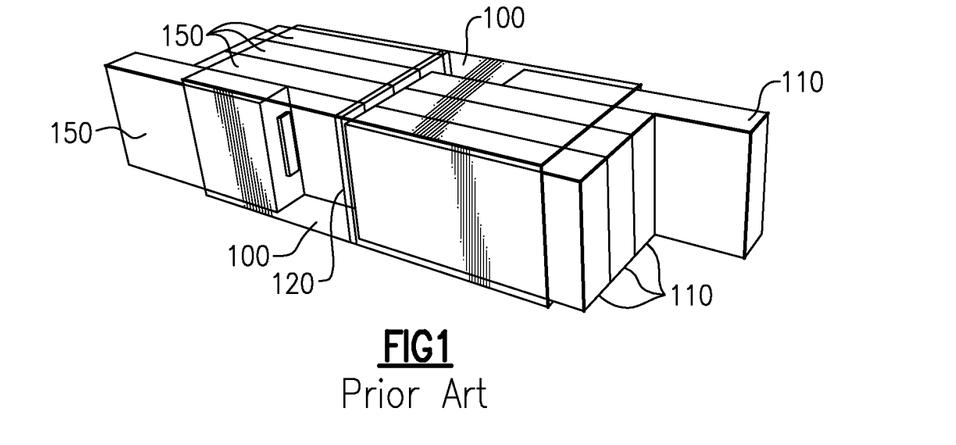
FIG. 1 is a prior art side view perspective illustration showing a horizontally stacked computer frame.

In prior art illustration of FIG. 1, a horizontally stacked system is shown. The frame is referenced as 200, and a number of components are depicted to be placed on the frame but in a horizontal fashion. The nodes, referenced as 110 often include the electronic components such as mother boards, daughter cards, logic entities and the like. Other components such as power supplies, referenced as 150, are then placed adjacent to these as shown. The prior art system of stacking these elements, however, can take up valuable foot print space in a crowded data center type environment and needs to be revised.

In order to minimize adverse dynamic loading effects, prior art frames have sometimes included a box in box approach. These designs often included a self contained sheet metal enclosure design. Unfortunately, with the advent of technology and the increase in the number of components in each system, these prior art solutions have become problematic both with respect to transportation and storage. On-going maintenance is also another issue that has made the prior art solutions impractical.

The cross-referenced application, incorporated herein by reference, provides a solution that is easy to install and transport using a mid-plane plate design for resolving dynamic load balancing issues. The present invention improves on those concepts and provide other alternative solutions for a robust assembly and related methodology that can support high density components while minimizing dynamic loading effects.

SUMMARY OF THE INVENTION

The shortcomings of the prior art are overcome and additional advantages are provided through the provision of a load balancing assembly for a computer frame having side walls. The assembly comprises a mid-plane plate having top and bottom sides and capable of being secured to the frame's side walls. The mid-plane plate has means both on its top and bottom sides for securing a number of electronic books in such a manner that the books can be stacked on top of one another. Each or a plurality of these books can also be removed easily without destabilizing the frame or forcing partial disassembly of the frame. A locking mechanism and method can also be provided alone or part of the assembly to secure the electronic books to the frame. In one embodiment, the mechanism comprises a first movable upper block placed at an angle over a fixed lower block such that the blocks form a wedge. A drive screw is then connected to the blocks such that turning the screw increases or decreases the distance between the block to engage or disengage the mechanism.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 2A:
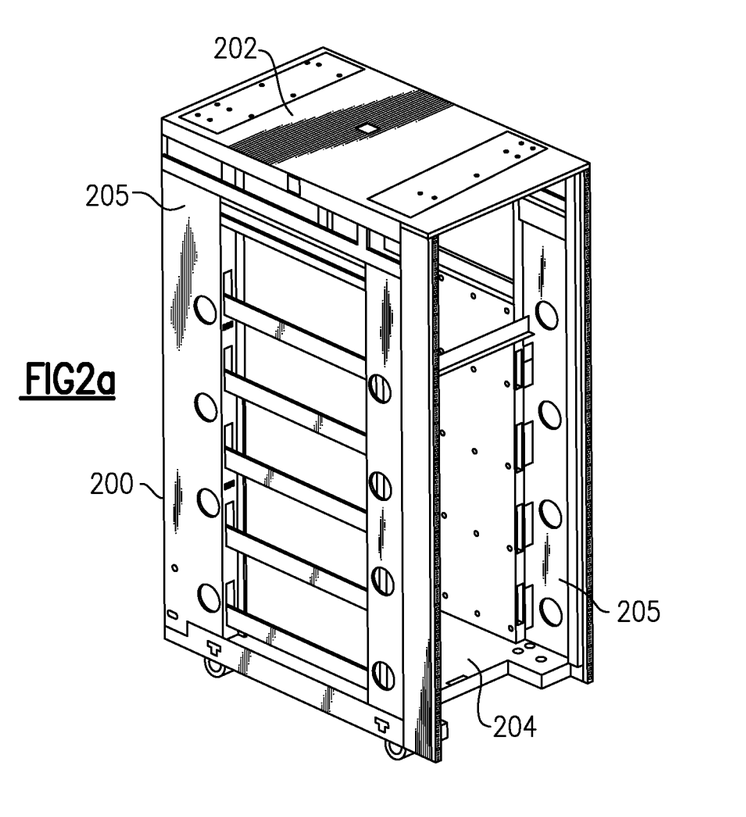
FIG. 2a is a perspective side view illustration of a computer frame such as the one used in conjunction with one embodiment of the present invention.

FIG. 2*a* is a perspective side view illustration of a computer frame, referenced as 200, such as the one used in conjunction with sophisticated computing system environments. The illustrated frame 200 have a cage like structure, with sidewalls, referenced as 205 and top and bottom surfaces, referenced as 202 and 204 respectively. This particular frame structure (i.e. cage) is provided for ease of visual understanding only and other frame structures and arrangements are possible when used with alternate embodiments. In addition, while the illustrated frame does not include any covers or doors, it is possible to incorporate such design in alternate embodiments.

Figure 2B:
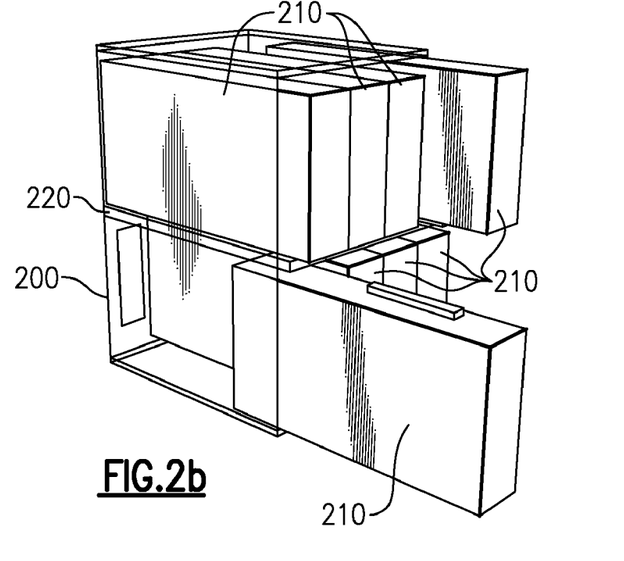
FIG. 2b is one embodiment of the present invention having a frame similar to that shown in FIG. 2a, and further including a horizontal mid-plane board or plate.

FIG. 2*b* provides for one embodiment of the present invention, where a frame with a new horizontal mid-plane board is implemented. FIG. 2*b* provides for a vertically stacked arrangement as opposed to prior art FIG. 1, where the components were stacked substantially horizontally.

As before the nodes include a variety of electronic components in the form of mother and daughter boards and the like will be housed by the frame. However, the nodes 110 of prior art FIG. 1 is replaced in the following figures by a new component referenced as 210. In the prior art FIG. 1, some components as power supplies were shown separately (referenced as 150). In the arrangement of FIG. 2, however, these additional components have been incorporated into the design of the "node" previously referenced as 110. To distinguish the new "node" from the old prior art assembled nodes of FIG. 1, a different referenced numeral 210 is used. Also to distinguish it further, node 100 will be used in conjunction with the assembled components of prior art FIG. 1, while an electronic book or simply book 210 will be used to refer to the new assembly as provided by the present invention.

Figure 3:
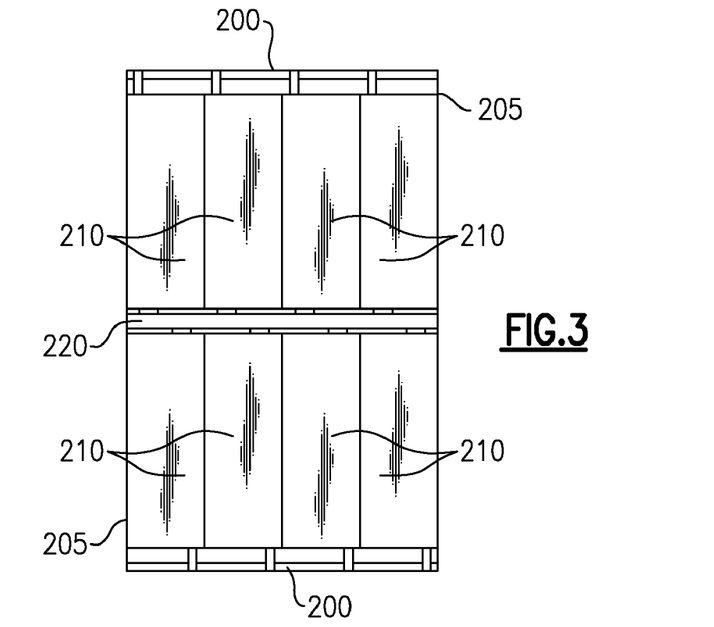
FIG. 3, a frontal view illustration of a vertically stacked computer frame as per one embodiment of the present invention.
Figure 4:
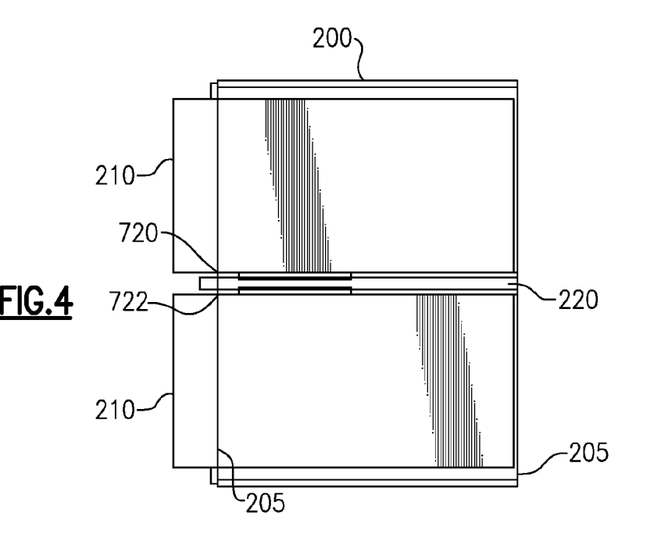
FIG. 4 provides a side view illustration of the vertically stacked computer frame of FIG. 3.

While FIG. 2*b* provides a perspective view illustration of one embodiment of the present invention as will be presently discussed, FIGS. 3 and 4 provide alternate views of the same embodiment to aid understanding. In FIG. 3, a frontal view is provided while FIG. 4 provides a side view. The purpose behind providing different views is to better discuss certain features that may only be visible from certain angle.

In the illustrated examples of FIGS. 2 through 4, as discussed, the books 210, are then stacked on top of one another. In a preferred embodiment as shown, 4 books are stacked on top of another 4 for a total of 8 books. The number of books, however, can vary and increased or decreased in alternate embodiments.

It is easy to comprehend the benefits associated with a vertical arrangement. In this particular example, the stacked structure not only doubles the density of nodes used, but also takes up less floor space which is at a premium in densely packed data centers. At the same time, a vertical arrangement, if not structurally enhanced can topple over easily and provide other problems in terms of structural rigidity as discussed earlier.

The methodology used in the embodiment, provides a plurality of different features used together and individually to resolve the load balancing issue. The first feature, as provided in the front view illustration of FIG. 3 provides for an improved mid-plane board with balancing load features. The mid-plane board is referenced in FIGS. 2 through 4 by numerals 220.

The frame's (200) sides including a top and bottom is better visible in FIGS. 3 and 4. As illustrated in these figures, the improved mid-plane is secured to the walls 205 of the frame 200 and has a selective thickness to provide support for the number of number of books to be inserted into the frame 200. The mid-plane 220 also has means to allow the books to be secured to it when desired. The method of securing the mid-plane to the books 210 or the frame walls 205 can vary as known to those skilled in the art. For example, screws, bolts, and nails can be used in such securing arrangements.

In another arrangement, the books 210 simply are slid into rails or grooves provided in the mid-plane and do not require additional securing means. Similarly, the mid-plane 220, itself may just slide into selective groves etc. as provided on the inside walls of the frame 200. It should be noted, that since the mid-plane is designed to provide load balancing security to vertically stacked arrangements, securing means has to be provided both to a top and a bottom surface of the mid-plane 220. An example of this is provided in the top view illustration of FIG. 4. The top and bottom sides of the mid-plane 220 are referenced as 720 and 722 alternatively. A side view illustration of the mid-plane plate is also provided in FIG. 7.

Figure 7:
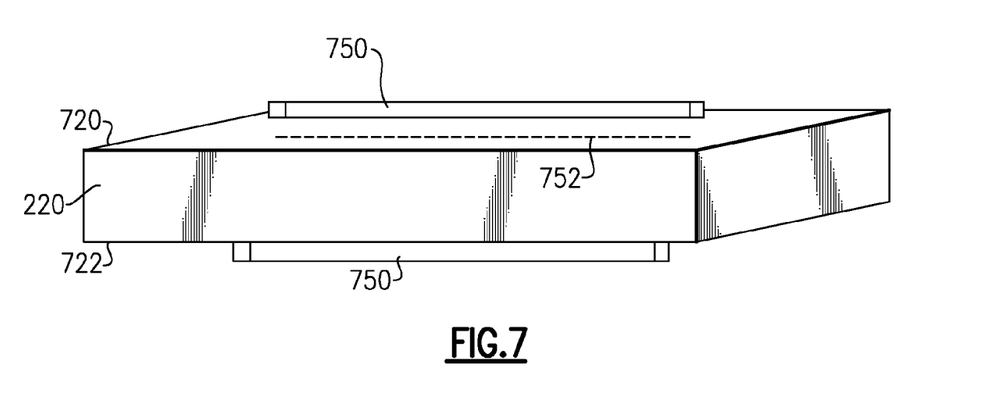
FIG. 7 is side view illustration of the mid-plane plate with exemplary means for securing one or more books.

FIG. 7 also provides for a structure 750 and apertures 752. The structure 750 and the apertures 752 are provided as way of example to represent one or more possible manner of securing books to the mid-plane. They can for instance be permanently secured to the frame using securing means or be removable such as by a sliding motion. The particular securing means are known to those skilled in the art and will not be discussed here in more detail.

Figure 5:
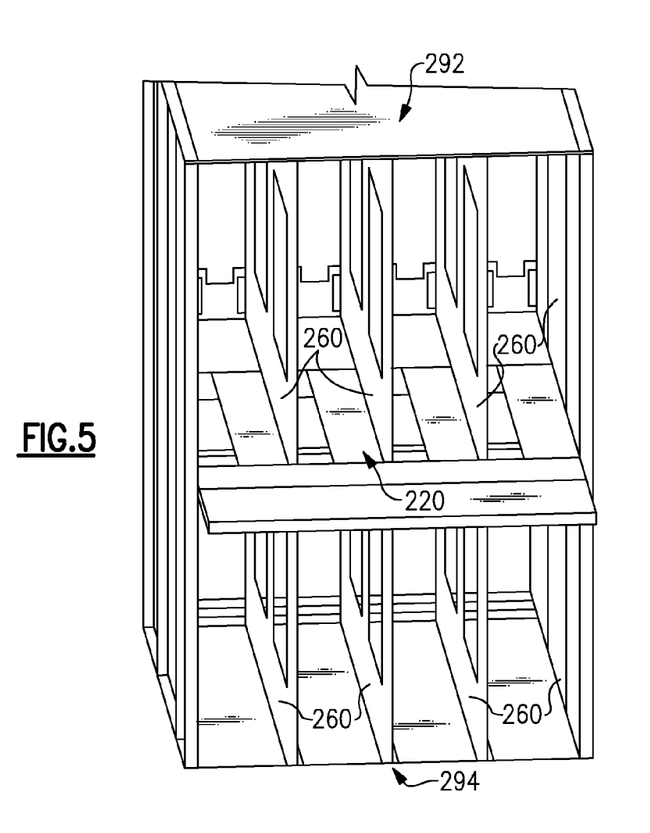
FIG. 5 provides a perspective side view illustration of the vertically stacked computer frame of FIG. 3.

In the perspective side view illustration of FIG. 5, an alternate embodiment is provided. In FIG. 5, a similar frame to that provided in FIG. 2-4 is shown having side walls 205 and a top and bottom referenced respectively as 202 and 204. The mid-plane 220 is also illustrated. In the alternate embodiment of FIG. 5, while the mid-plane 220 is secured as before to the walls 205 of the frame 200, it is possible to also include similar other load balancing plates to the top and bottom surface of the frame 200. These additional balancing stiffener plates are referenced as 260.

The balancing stiffener plates 222 and 224 can also be secured to the walls 205 or alternatively even to the top and bottom of the frame 200, or as before just slide into place. In one embodiment, it is possible for the balancing planes 222 and 224 to have additional means for holding and/or securing the books 210, in a similar way as previously discussed in conjunction with the mid-plane. It is also possible for these additional planes 222 and 224 to be molded into the top and bottom of the frame 200 such that they are part of the frame 200.

The mid-plane plate's 220 means such as the examples shown in FIG. 7, allow for a number of electronic books to be disposed adjacent to one another or stacked on top of each other. In addition, securing the books further to the top 202, bottom 204 and or the mid-plane section 220 of the frame 200, allows the books to be removed and replaced one or more at a time without destabilizing the frame or having to partially disassemble it. It is even possible to remove the entire mid-plane section 220 in this way.

The embodiments provided in FIGS. 3 through 5 provide a system and related a method to balance a very high load imparted by the insertion of many more nodes. Implementing balancing load features in the manner suggested also reduces the deflection of the mid-plane as was used traditionally. This reduction in order of load magnitude is depicted graphically in FIG. 6.

Figure 6:
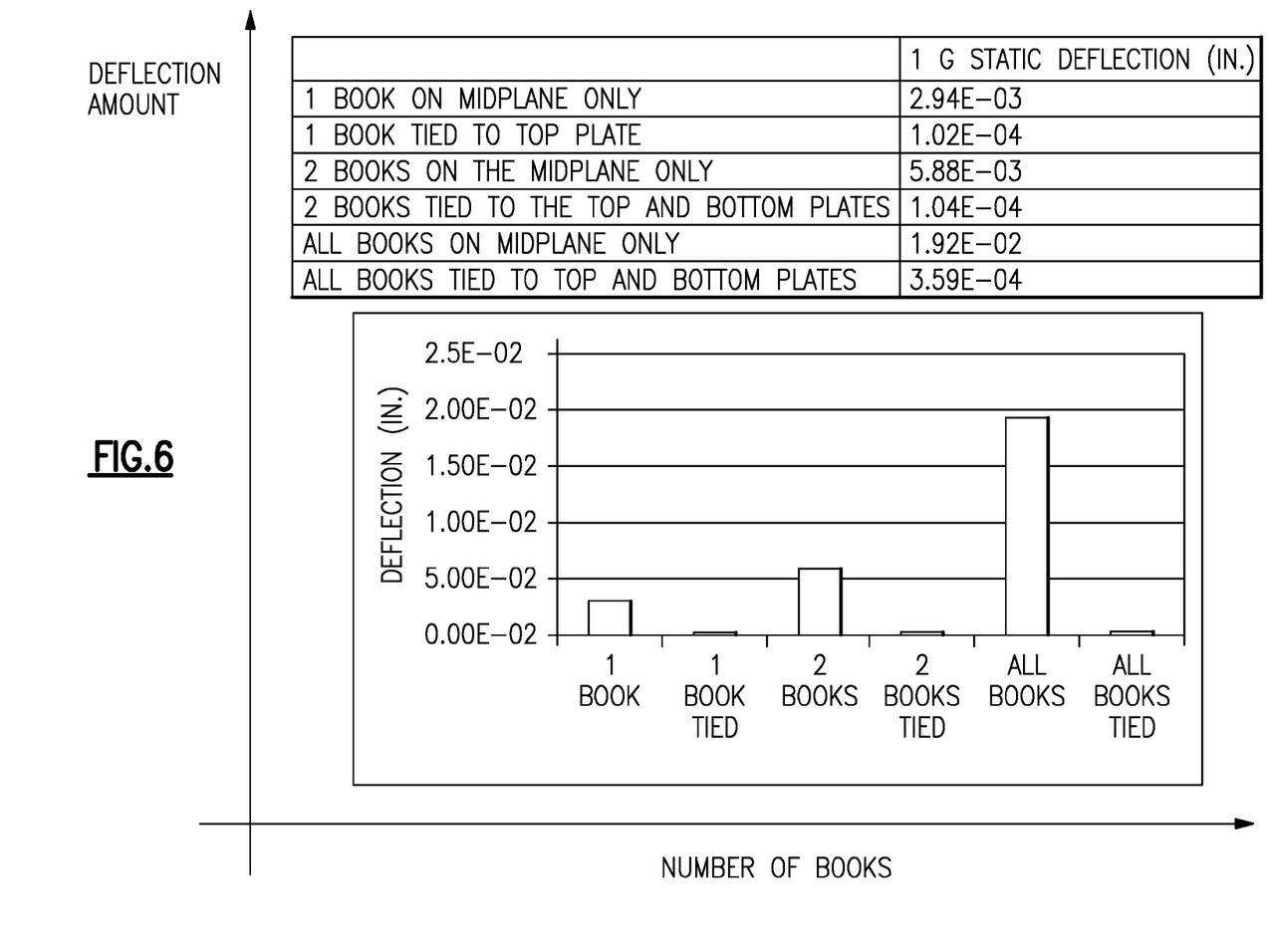
FIG. 6 provides a graphical depiction of the amount of deflection as a function of the overall load magnitude for a computer frame.

In FIG. 6, as shown the deflection is measured as a function of the number of books used which in turn represent the total load magnitude placed on the frame. The graphical results of FIG. 6 represent actual tested case examples. As illustrated, without the balancing feature the deflection of the mid plane is 0.003 inches when subjected to 1 G load and when subjected to 200 G, therefore the estimated deflection will be around 0.3 inches. Using the balancing features of the present invention, however, even in the event that all books of the example are installed, shows a deflection close to a zero load and in any case much lower in magnitude than the previous 0.03 inches.

Referring back to FIG. 5, in an alternate embodiment, it is possible to also implement other vertical divider plates depicted as 260. These planes can be alternatively secured to the top 222, bottom 224 and mid-plates 220 (mid-plane) to provide additional support and also to physically separate the books 210. The vertical plates 260, can be installed and de-installed selectively and are secured by means known to those skilled in the art and as previously discussed in relation to other plates.

Furthermore, once the electronic device (i.e. electronic book) is docked and secured to the mid-plane (assembly) such as by means of a connector or other means, a locking mechanism can also be provided to secure the connection even further. In one embodiment, it is possible to use more rudimentary means such as fasteners. If used, such fasteners could be located at the connector or on a subsequent feature of the assembly that is running parallel to the connector interface. Another method is to secure a secondary feature to secure the devise. Again this feature would be mounted parallel to the connector interface. These methods work well when access is available to the plane running parallel to the interface. However, when the device is plugged in a horizontal or vertical orientation and the fasteners are accessed in the same direction, issues stem from use of such fasteners. An example would be a PC card with card inserters at the end. The card is positioned on card guides, slid into position and plugged into the connector using the attached inserters. In this way access to the end of the card opposite and parallel to the connector is made available. However, in such examples, access to the end of the device parallel to the connection is minimal since the device is plugged perpendicular to the connection. There is no room to access fasteners. A means of exerting a force on the device by activating a feature that is perpendicular to the connector interface is then required. Consequently, in an alternate embodiment as illustrated in FIGS. 8 and 9 an improved locking mechanism is provided that addresses these issues.

Figure 8:
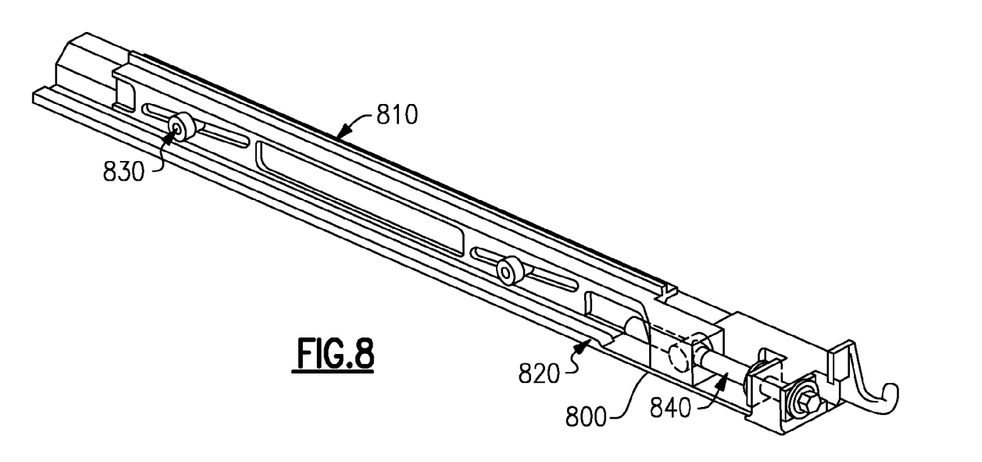
FIG. 8 is a perspective side view illustration of a locking mechanism as per one embodiment of the present invention.

The perspective side view illustration of FIG. 8, shows a locking mechanism 800 as per one embodiment of the present invention. As illustrated two opposing blocks 810 and 820 are provided. In this example the upper and lower blocks 810 and 820 form a wedge as shown. In the embodiment of FIG. 8, the upper block 810 is designed to be moveable, while the lower block 820 is fixed. The distance between the blocks can be expanded selectively by turning a lead or drive screw depicted in the figure by numerals 840. This will in turn engage and/or disengage the locking mechanism 800 as will be presently explained.

The lead or drive screw 830 operates in conjunction with at least one and preferably a plurality of shoulder screws (collectively referenced as 830 in the figures) to provide a more controlled expansion in one embodiment. For example, in the embodiment shown, turning the lead screw 830 counter clock wise, creates the smallest collective height between the blocks 810 and 820. The mechanism 800 is then positioned under the device (which can now be parallel to the connection interface). Alternatively, in this embodiment, by turning the lead screw 830 clockwise, the collective height increases until it applies force against the bottom of the device and consequently to the connection interface.

Figure 9:
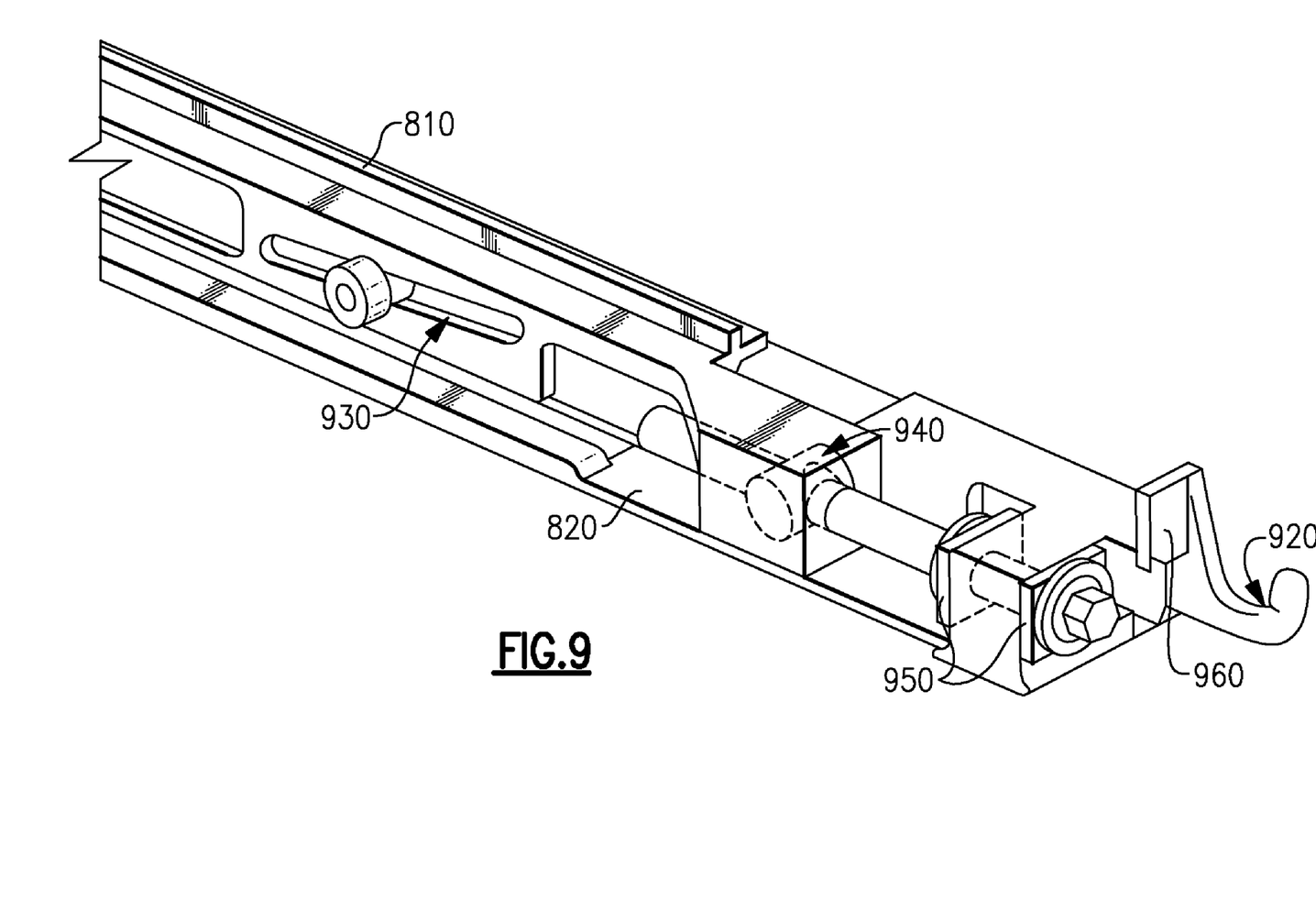
FIG. 9 is more detailed illustration of the perspective side view locking mechanism provided by the embodiment of FIG. 8.

FIG. 9 provides a more detailed illustration of the mechanism provided in the embodiment of FIG. 8. Typically, after an electronic book or device (i.e. PU Book) is installed, the book can be disposed on a rail (i.e. of a rack) that is part of the CEC/cage enclosure. The device is then lifted using a unique actuation system, as will be presently discussed that is attached to the CEC enclosure and PU Book. After the device is fully seated into the connector it needs to be locked in place. To enable this, the first step to be taken is to ensure that a locking mechanism 800 of FIG. 8/9 is at its lowest point. This is accomplished as discussed by turning the drive screw 840 counter-clockwise. Holding the assembly by the handle shown in FIG. 9 and referenced as 920, the mechanism 800 can now be disposed under the book (such as on the slide that is part of the CEC enclosure) until it comes to a stop. The mechanism 800 is now positioned under the book and the drive screw 840 can be turned clockwise. This will allow the upper block 810 to rise and engage the underside of the book. This will continue until the mechanism 800 comes to a hard stop, locking the book in place.

It should be noted that the mechanism 800 that lifts the upper block in turn consists of the plurality of fixed shoulder screws 830 as discussed. The shoulder screws 830 in turn mount into the lower (fixed) block 820 in one embodiment. These shoulder screws 830 can also pass through a plurality of angled slots 930 before they are mounted to the fixed block 820. Through these angled slots, an up and down motion is created when the shoulder screw 830 is turned. The drive screw 830 passes through the front of the fixed block 820 and into a swivel nut 940 on the movable block 810. The swivel nut 940 is captive on the movable block, but allowed to rotate. As the drive screw 840 is turned it pulls or pushes on the movable block. As it is pulled, turning the drive screw clockwise in this example, the angled slots in contact with the shoulder screw 830 raise the movable block up. As it is pushed, turning the drive screw 840 counter-clockwise in this example, it lowers the block. In addition, as illustrated it is optionally possible to add one or a plurality of swivel washers 950, around selective areas making the movement of the drive screw 840. The purpose of the swivel washers 950 is to pivot as it rotates against the swivel nut 940 to aid operation.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A load balancing comprising:
    a computer frame for housing one or more electronic books such that said books can remain plugged in;
    said computer frame having side walls;
    a mid-plane having top and bottom sides and capable of being secured to said frame's inside side walls;
    said mid-plane being engageable both on its top and bottom with said electronic books, in a manner such that said books can be disposed adjacent to one another as well as stacked on top of one another above and below said mid-plane;
    said mid-plane being reinforced selectively to provide structural support to said frame and said electronic books such that removal or insertion of one or more of said electronic books does not cause said frame to become unstable and move in one direction or another;
a locking mechanism for locking electronic devices placed on said computer frame, further comprising:
a first movable upper block placed at an angle over a fixed lower block; and
a drive screw connected to said upper and lower blocks; said drive screw being turnable to increase a distance between said upper and lower blocks to engage said mechanism and apply force against an electronic book in said computer frame, and being turnable to decrease a distance between said upper and lower blocks to disengage said mechanism and remove said force against the electronic book.

2. The assembly of claim 1, further having a plurality of top and bottom stiffener planes capable of being secured to said side walls and engageable with said electronic books to further selectively reinforce and readjust load balancing of said frame and said electronic books.

3. The assembly of claim 2, wherein said assembly also comprises a plurality of divider plates capable of being secured to said frame and mid-plane selectively such as to partition said electronic books internally; said plates also being selectively reinforced to adjust load balancing of said frame with said electronic books.

4. The assembly of claim 1, wherein said frame has additional top and bottom surfaces that can be secured to it for additional reinforcement and load support to balance weight such that when one or more of said electronic books are removed, said assembly does not shift in one direction or another.

5. The assembly of claim 3, wherein said frame also comprises a multi-wall reinforced top surface having a selective thickness to dissipate load balancing such that removal or insertion of any of said books at any location does not affect integrity of said assembly.

6. The assembly of claim 4, wherein said additional top and bottom surfaces are comprised of steel.

7. The assembly of claim 1 wherein shoulder screws mount into said lower fixed block.

8. The assembly of claim 7 wherein said shoulder screws pass through a plurality of angled slots before they are mounted to said fixed lower block such that an up and down motion is created when said shoulder screw is turned.

9. The assembly of claim 1 wherein said drive screw passes through the front of said fixed lower block.

10. The assembly of claim 1 wherein said drive screw passes through the front of said fixed lower block and into a swivel nut on said movable block.

11. The assembly of claim 10 wherein said swivel nut is captive on said movable block but allowed to rotate.

12. The assembly of claim 11 wherein a plurality of swivel washers are also provided to operate with said drive screw.

13. The assembly of claim 12, wherein said swivel washers are disposed so as to pivot and rotate against said swivel nut.

14. A load balancing assembly comprising:
a computer frame for housing one or more electronic books such that said books can remain plugged in;
said computer frame having side walls;
a mid-plane having top and bottom sides and capable of being secured to said frame's inside side walls;
said mid-plane being engageable both on its top and bottom sides with said electronic books in a manner such that said electronic books can be disposed adjacent to one another as well as stacked on top of one another above and below said midplane;
said mid-plane being reinforced selectively to provide structural support to said frame and electronic books such that removal or insertion of one or more of said electronic books shall not cause said frame to become unstable and move in one direction or another; and
a locking mechanism for securing said electronic books in said computer frame; said computer frame having a first movable upper block placed at an angle over a fixed lower block; a drive screw connected to said upper and lower blocks said drive screw being turnable to increase a distance between said upper and lower blocks to engage said mechanism and apply force against an electronic book in said computer frame, and being turnable to decrease a distance between said upper and lower blocks to disengage said mechanism and remove said force against the electronic book.

15. The assembly of claim 14 wherein said drive screw operates in conjunction with a plurality of shoulder screws.

16. The assembly of claim 14 wherein said shoulder screws pass through a plurality of angled slots before they are mounted to said fixed lower block such that an up and down motion is created when said shoulder screw is turned.

17. The assembly of claim 14 wherein said drive screw passes through the front of said fixed lower block and into a swivel nut on said movable block further comprising a plurality of swivel washers disposed so as to pivot and rotates against said swivel nut.

18. The assembly of claim 14 further having a handle.

19. A method for securing electronic books on a computer frame comprising the steps of:
providing load balancing for said frame by adding a selectively reinforced mid-plane and a plurality of selectively reinforced divider plates between said books such that when one or more books are removed from said frame or inserted thereto a center of gravity of said frame and said books remains substantially unaffected;
providing a locking mechanism for each book by disposing a first movable upper block at an angle over a fixed lower block;
connecting a rotatable drive screw to said upper and lower blocks such that said drive screw is turnable to increase a distance between said upper and lower blocks;
engaging said mechanism by turning said drive screw in one direction to apply force against an electronic device in said computer frame; and disengaging said mechanism by turning said screw in a different direction to decrease a distance between said upper and lower blocks to disengage said mechanism and remove said force against the electronic device.

* * * * *